United States Patent Office 3,203,940
Patented Aug. 31, 1965

3,203,940
OLEFIN COPOLYMERIZATION PROCESS
Wendell P. Long, Wilmington, Del., assignor to Hercules Powder Company, Wilmington, Del., a corporation of Delaware
No Drawing. Filed Oct. 4, 1962, Ser. No. 228,225
5 Claims. (Cl. 260—88.2)

This invention relates to an improved process for copolymerizing ethylene and a higher 1-olefin in carbon tetrachloride, and more particularly to copolymerizing ethylene and a higher 1-olefin using a particular catalyst system which has unexpected activity in carbon tetrachloride.

It is known that ethylene and one or more other olefins can be copolymerized at relatively low temperatures and pressures by means of the so-called Ziegler catalyst, e.g., a transition metal compound used in combination with a metal alkyl.

It has been proposed in an earlier proposal to copolymerize ethylene with a second olefin in a homogeneous liquid phase reaction mixture by passing ethylene and the other olefin into carbon tetrachloride in the presence of a small amount of a catalyst dissolved in the carbon tetrachloride, the catalyst being formed in situ by mixing a vanadium compound with an alkylaluminum compound. Although in the previously proposed process it is possible to produce high yields of homogeneous copolymer per unit of vanadium, the alkylaluminum compound must be added during the course of the reaction and its concentration carefully controlled. The reason for this is not known with certainty. It is hypothesized that if an insufficiency of alkyl groups are present in the reaction mixture, a cationic polymerization takes place since low molecular weight copolymers, generally oils, are observed in the product under such conditions; and that if an excess of alkylaluminum compound is present, all of the vanadium is reduced to a valence state of 2, thus producing an inactive catalyst species since the copolymerization reaction ceases. However, if the amount of alkylaluminum compound which is added to the reaction mixture is carefully controlled and regulated, and the reaction is carried out in carbon tetrachloride, the carbon tetrachloride apparently functions to oxidize the vanadium, which has been reduced by the alkylaluminum compound or by polymerization termination reactions, back to a higher level which is then again reduced by further alkylaluminum compound, and this cycle repeats itself with the result that high yields of copolymer per unit of vanadium are obtained.

Also, in the earlier proposed process it is essential that the ratio of alkyl radicals to aluminum in the reaction mixture be maintained between 1 and 2. When the alkylaluminum compound is acting to reduce the vanadium compound, there is a loss of one alkyl (replaced by chlorine) for each unit of valence that the vanadium compound is reduced, the freed alkyl being evolved as alkane, or alkene, or a mixture thereof. The alkylaluminum compound in turn becomes poorer in alkyl and richer in chlorine or other anion. If insufficient alkylaluminum compound is added to maintain the ratio of alkyl to aluminum within the range of 1 and 2, there is ultimately formed aluminum chloride which causes a cationic polymerization to take place with the consequent production of low molecular weight copolymer, generally oils, in the product. In addition to the continuous replacement by chlorine or by other groups of the original alkyl groups of the alkylaluminum compound, due to the continuous reactivation of vanadium which has been regenerated from the inactive decay product, it is necessary to take into account the problem of the direct reaction of aluminum alkyls with the carbon tetrachloride. This is particularly important in the case of trialkylaluminum compounds which are not branched near the point of attachment of alkyl to aluminum. For example, triethylaluminum reacts very vigorously with carbon tetrachloride, giving diethylaluminum chloride and other products. This reaction, which not only results in a wastage of alkyl groups but also in difficulty of control of the reaction, can be avoided by adding the triethylaluminum only as fast as ethylaluminum dichloride is produced by the continuous reactivation of vanadium. The net effect is then the production of diethylaluminum chloride by reaction of the added triethylaluminum with ethylaluminum dichloride. In the case of trialkylaluminum compounds which are branched or cyclic in structure, the reaction with carbon tetrachloride is of low order. In the same way, the alkylaluminum halides react only very slowly with carbon tetrachloride and, hence, this side reaction is of no importance.

Additionally, in the earlier process it is essential that the temperature of the polymerization reaction be carefully controlled and preferably maintained at about 30 to 45° C. since higher temperatures reduce the molecular weight of the copolymer and lead to cationic polymerization to low molecular weight oils. Such a temperature limitation in plant scale continuous operations means that tremendous amounts of heat must be dissipated, which in turn requires refrigeration means and additional expense in equipment and operating costs.

Now it has been found that the rate of copolymerization of ethylene with a second olefin in the presence of carbon tetrachloride can be increased manyfold and exceedingly high yields of homogeneous copolymer obtained with much smaller quantities of the vanadium component of the catalyst than heretofore used without the disadvantages of maintaining the strict controls on the amount of alkylaluminum compound and the temperature of the polymerization reaction essential to the earlier process.

Accordingly, the present invention is directed to an improved process for copolymerizing ethylene with at least one other ethylenically unsaturated hydrocarbon in carbon tetrachloride in the presence of a small amount of a catalyst formed from a vanadium compound and an alkylaluminum compound, the improvement comprising carrying out the copolymerization in the presence of an electron donor compound of an element selected from the group consisting of Groups V–A and VI–A of the Periodic Table, said electron donor compound being chemically reactive with the alkylaluminum compound by sharing electrons therewith. In order to obtain the full benefits of the invention, the vanadium compound that is used as one of the catalyst components must be present in the reaction mixture in an exceedingly small amount, i.e., within the range of from about 0.0005 to about 0.05 mmole per liter of carbon tetrachloride.

The carbon tetrachloride diluent is a vital feature of this invention in that this diluent provides an oxidative medium for regeneration of the catalyst and thus makes it possible to obtain high yields of copolymer with exceedingly small quantities of the vanadium compound, a result not realizable with the common hydrocarbon solvents, e.g., n-heptane, benzene, toluene, and the like, which are usually employed for liquid phase polymerization reactions. Although it is preferred that carbon tetrachloride be employed as the sole diluent, mixtures thereof with other inert solvents such as the aliphatic or aromatic hydrocarbons may be used provided the amount of the other solvent does not destroy the regenerative nature of the diluent or the advantages of the invention.

It is well known in the art that in the polymerization of ethylene, for example, even trace amounts of certain electron donor compounds such as acetic acid or acetone destroy the catalytic activity of typical Ziegler catalysts such as derived from titanium tetrachloride and triethylaluminum. It was therefore surprising to discover that these same compounds could be used as catalyst activators in the polymerizaion process of the invention without destroying the polymerization activity.

By using the electron donor compounds of Groups V–A or VI–A for this copolymerization reaction in carbon tetrachloride, it has been found that the activity of the catalyst is increased manyfold, that this activity is maintained over much longer periods of time, and that an otherwise "used" or deactivated catalyst is reactivated. Just what may be the mechanism that takes place that enables these electron donor compounds to activate the copolymerization reaction is not known. It is hypothesized that the electron donor compound complexes with the alkylalunium component as well as the vanadium component and that as these competitive reactions are taking place the vanadium is reduced by free alkylaluminum compound and the reduced vanadium compound is oxidized by the carbon tetrachloride.

It has further been found that the process of this invention has the advantage of permitting the use of an alkylaluminum dihalide activator.

Another advantage that is realized using the electron donor compounds in the copolymerization of ethylene and higher olefins in carbon tetrachloride is that the copolymerization may be carried out at a higher temperature without producing low molecular weight or oily copolymers. This temperature advantage means a great saving in operational costs and cooling equipment.

Any alkylaluminum compound may be used as one of the catalytic components in accordance with this invention. Thus, any trialkylaluminum, dialkylaluminum halide, or alkylaluminum dihalide can be used or mixtures of these aluminum compounds. Especially suited is the mixture of dialkylaluminum halide and monoalkyl dihalide known as aluminum alkyl sesquihalides and which has an average of 1.5 alkyl groups per atom of aluminum. Exemplary of the aluminum compounds that may be used are compounds having the formula $R_3Al$, $R_2AlX$, or $RAlX_2$, where R may be any hydrocarbon group such as alkyl, cycloalkyl, aralkyl, etc., and X is halogen. Thus, the hydrocarbon group may be methyl, ethyl, propyl, isopropyl, n-butyl, isobutyl, tert-butyl, amyl, isoamyl, hexyl, isohexyl, 2-methylpentyl, octyl, 2-ethylhexyl, cyclohexyl, benzyl, etc., and the halogen may be chlorine, bromine, or iodine. As already mentioned, mixtures of any of these aluminum compounds may be used and are frequently desired. Particularly effective aluminum alkyl sesquihalides are, for example, ethylaluminum sesquichloride, isobutylaluminum sesquichloride, etc.

Any vanadium compound that is soluble in carbon tetrachloride, or monomer-saturated carbon tetrachloride, may be used as the vanadium component of the catalyst. Exemplary of such vanadium compounds are the vanadium tetrahalides, vanadium oxytrihalides, vanadium acetylacetonates, trialkyl orthovanadates, dialkyl chloro-orthovanadates or monoalkyl dihalo-orthovanadates, etc. Exemplary of such vanadium compounds are vanadium tetrachloride, vanadium tetrabromide, vanadium oxytrichloride, vanadium oxytribromide, vanadium ovytriiodide, vanadium triacetylacetonate, vanadium oxydiacetylacetonate, vanadium oxytriacetylacetonate, vanadium oxytri (fluoroacetylacetonate), vanadium oxytri(hexafluoroacetylacetonate), triethyl vanadate, triisobutyl vanadate, tri-tert-butyl vanadate, diethyl chloro-orthovanadate, monoethyl dichloro-orthovanadate, etc. Obviously, mixtures of these vanadium compounds may be used if desired. In the same way, already partially reduced vanadium compounds may be used, as, for example, premixed catalysts prepared by premixing one of these vanadium compounds with an alkylaluminum compound, which premixed catalyst is then used in combination with additional alkylaluminum compound.

Any electron donor compound of an element of Groups V–A or VI–A of the Periodic Table which is chemically reactive with the alkylaluminum compound by sharing of electrons or forming species similar to "charge transfer compounds" therewith may be used in accordance with the present invention. When referring to electron donor compounds herein, it is meant compounds that possess at least one unshared pair of electrons which can become attached to a molecule accepting an electron pair. Many electron donor-acceptor pairs are known, the donor-acceptor combination being referred to either as a complex or a solvate. The electron donor compounds employed in the practice of this invention are those which are chemically reactive with the alkylaluminum compound by sharing electrons therewith, and which are compounds of Groups V–A or VI–A of the Periodic Table. More particularly, the electron donor compounds of this invention are compounds of nitrogen, phosphorus, arsenic, antimony, bismuth, oxygen, sulfur, selenium, and tellurium.

Among the nitrogen compounds that can be used are ammonia, the amines, amides, lactams, urea and substituted ureas, nitriles, pyridine and substituted pyridines, and the like. Particularly suitable are amines of the formula $R_3N$ wherein R is selected from the group consisting of hydrogen and hydrocarbon radicals. Preferably, the hydrocarbon radicals are 1–12 carbon alkyl, aryl, or aralkyl radicals such as methyl, ethyl, propyl, butyl, octyl, dodecyl, phenyl, phenylethyl, naphthyl, and like radicals. Among the specific compounds that can be used are tributylamine, diethyl aniline, aniline, diphenylamine, diphenylmethylamine, triphenylamine, dimethyl aniline, n-butylamine, diisopropylamine, triethylamine, tribenzylamine, methylphenylbenzylamine, quinoline, acetonitrile, acrylamide, pyridine, 2-vinyl pyridine, 4-vinyl pyridine, and the like.

Among the phosphorus compounds that can be used are phosphine, alkyl and aryl phosphines, phosphites, phosphorus halides and alkyl and aryl phosphorus halides. Particular phosphorus compounds that can be used include phosphorus trichloride, tri-n-butyl phosphine, triphenyl phosphine, tri-p-anisyl phosphine, trimethyl phosphite, triphenyl phosphite, and the like.

Among the suitable arsenic compounds are arsine, alkyl and aryl arsines, arsenic halides and alkyl and aryl arsenic halides. Particularly useful are compounds of the formula $R_3As$ wherein each R is hydrogen or a hydrocarbon radical. Preferably, the hydrocarbon radical contains 1–12 carbon atoms and is selected from the group consisting of alkyl, aryl, and aralkyl radicals. The preferred arsenic compounds are tributyl arsine and triphenyl arsine.

Among the antimony compounds that can be used are stibine, alkyl and aryl stibines, antimony halides and alkyl and aryl antimony halides. Particularly useful are compounds of the formula $R_3Sb$ wherein each R is hydrogen or a hydrocarbon radical. Preferably, the hydrocarbon radical contains 1–12 carbon atoms and is selected from the group consisting of alkyl, aryl, and aralkyl radicals. The preferred antimony compounds are tri-n-butyl stibine, triphenyl stibine, and antimony pentachloride.

The bismuth compounds useful in the present invention are bismuthine, alkyl and aryl bismuthines, bismuth halides and alkyl and aryl bismuth halides. Particularly useful are bismuthines of the formula $R_3Bi$ wherein each R is hydrogen or a hydrocarbon radical. Preferably, the hydrocarbon radical contains 1–12 carbon atoms and is selected from the group consisting of alkyl, aryl, and aralkyl radicals. The preferred bismuth compounds are bismuthine, tributyl bismuthine, and triphenyl bismuthine.

Among the oxygen compounds that can be used in the invention are ethers, esters, aldehydes, ketones, acids, acid halides, and phenols. Specific ethers that can be used include tetrahydrofuran, di-n-butyl ether, dioxane, dibenzyl ether, anisole, diphenyl ether, furan, diethyleneglycol dimethyl ether, diisopropyl ether, diisoamyl ether, and the like. Specific esters that can be used include ethyl acetate, butyl formate, methyl benzoate, phenyl propionate, methyl acrylate, methyl methacrylate, vinyl acetate, and the like. Specific aldehydes that can be used include caproic aldehyde, benzaldehyde, acetaldehyde, propionaldehyde, valeraldehyde, phthalaldehyde, and the like. Specific ketones that can be used include acetone, acetophenone, benzophenone, quinone, diacetone alcohol, mesityl oxide, acetyl acetone, and the like. Specific acids that can be used include acetic acid, formic acid, 2-ethyl hexanoic acid, benzoic acid, propionic acid, valeric acid, and the like. Specific acid halides that can be used include acetyl chloride, propionyl chloride, phosgene, benzoyl chloride, and the like. Specific phenols that can be used include phenol, α-naphthol, β-naphthol, ortho-, meta-, or para-cresol, and the like.

Among the sulfur compounds that can be used are the organic sulfoxides, sulfones, sulfates, sulfonates, sulfonamides, sulfoximines, sulfides, and the like. Specific organic sulfur compounds that can be used are dimethyl sulfoxide, dimethyl sulfone, diethyl sulfate, N,N-dimethylbenzene sulfonamide, dimethyl sulfoximine, diphenyl sulfoxide, ethylbenzene sulfonate, dihexyl sulfoximine, dibutyl sulfoxide, dioctyl sulfone, diphenyl sulfate, N,N-dipropylbenzene sulfonamide, diethyl sulfoxide, decyl sulfide, diphenyl sulfide, diisopropyl sulfide, and the like.

Typical compounds of selenium and tellurium that are useful in the practice of the invention include dimethyl selenide, dibutyl selenide, dimethyl telluride, dibutyl telluride, and the like.

The copolymerization reaction may be carried out under a variety of conditions and may be operated as a batch or continuous operation. The temperature at which the copolymerization reaction is carried out will preferably be within the range of from about 0° C. to about 80° C., and more preferably within the range of from 30° C. to about 60° C. In general, the reaction will be carried out at or about atmospheric pressure, but may be carried out anywhere from 1 to 30 atmospheres pressure, or, if desired, at much higher pressures, or at less than atmospheric pressure.

As has already been pointed out above, it is essential that the vanadium compound be present in the reaction mixture in an exceedingly small amount, i.e., within the range of from about 0.0005 to about 0.05 mmole per liter of carbon tetrachloride, and preferably within the range of from about 0.001 to about 0.01 mmole. Amounts below about 0.0005 mmole give too low a rate of reaction to be of practical significance, and amounts above about 0.05 mmole produce a surge of the reaction which immediately becomes uncontrollable. The amount of the alkylaluminum component employed can be varied over a wide range, and is usually employed within the range of from about 0.1 to about 100 mmoles per liter of carbon tetrachloride, and preferably within the range of from about 1 to about 20 mmoles. Sufficient alkylaluminum compound must, of course, be present to react with any impurities in the system such as oxygen and water and still provide sufficient alkyl groups to react with the vanadium compound to produce the active catalyst. A large excess of alkylaluminum compound is not harmful.

The amount of the electron donor compound to be employed is dependent upon the strength or coordinating power or ability of the donor itself, which is relatively measured by the heats of formation of its complexes or which may be estimated by relative basicity toward a standard acid. These values have been determined in some series of compounds and are readily available in the literature (see, for example, Bonitz, Chem. Ber. 88, 742 (1955) and Gerrard and Macklen, Chem. Rev. 59, 1105 (1959)). Depending upon the strength of the electron donor compound, the amount will be sufficient to activate the catalyst but will be less than the amount required to complex all the alkylaluminum compound present. In general, with strong donor compounds such as the ketones, some amines and some ethers such as, for example, dibutyl ether, tetrahydrofuran, acetone, acetic acid, ammonia, n-butyl amine, triphenyl arsine, and the like, the amount will be considerably less than that stoichiometrically equivalent to the alkylaluminum compound, and preferably is equivalent to about 0.02 to about 2.6 mmoles per liter of carbon tetrachloride containing 4 mmoles of alkylaluminum compound and 0.003 mmole of vanadium compound per liter of carbon tetrachloride. With weak donor compounds such as anisole, diphenyl ether, furan, and the like, the amount will usually be greater than that stoichiometrically equivalent to the alkylaluminum compound since the low complexing ability of the donor permits free alkylaluminum to be present when much larger amounts of the electron donor are employed. Generally speaking, with a weak donor compound such as anisole, the amount required for a maximum rate of reaction will be about 3.4 mmoles per liter of carbon tetrachloride, and with a very weak donor such as furan, about 30 mmoles per liter of carbon tetrachloride.

By carrying out the copolymerization reaction in accordance with this invention, it is possible to prepare a copolymer of any desired composition of from about 0.5 to about 99.5 mole percent of ethylene and 99.5 to 0.5 mole percent of other olefins. For use as a synthetic rubber, an ethylene-α-olefin copolymer will generally preferably contain from about 40 mole percent to about 75 mole percent of ethylene, copolymers having more mole percent of ethylene than this range being more plastomeric than elastomeric, and products having a lower mole percent of ethylene being more difficult to cure and having poorer low temperature properties. It is likewise possible to prepare copolymers of any desired molecular weight by minor adjustments in the copolymerization conditions.

It is desirable for the production of homogeneous copolymers that the ratio of ethylene to the other olefin or olefins, as, for example, propylene, dissolved in the reaction mixture be maintained at a constant level throughout the copolymerization reaction. This is readily done by saturating the liquid reaction mixture with a given monomer concentration and maintaining the saturatiton at this level. During the copolymerization the ratio of ethylene to other olefins, for example, propylene, in the gas phase is very different from that in the liquid phase since propylene is more soluble than ethylene, and ethylene is more reactive than propylene so that the two monomers do not enter the polymer in the ratio of their concentration in solution. In order to obtain a homogeneous copolymer, one can saturate the diluent initially with a mixture of the monomers containing a given mole per cent of propylene and then keep the composition of the gas in equilibrium with the liquid constant at that value throughout the copolymerization reaction. This can be done, for instance, by monitoring the composition of the off-gas from the reaction and maintaining the composition at the desired level by adjusting the ratio of ethylene and propylene in the inlet stream. Alternatively, a continuous polymerization may be carried out under steady-state conditions.

In accordance with this invention, any mono- or diolefin or mixtures thereof can be copolymerized with ethylene to produce a copolymer, as, for example, linear 1-olefins such as propylene, 1-butene, 1-dodecene, etc., or conjugated or unconjugated polyolefins such as isoprene, 2-methyl-1,3-pentadiene, 2-methyl-1,5-hexadiene, 1,9-octadecadiene, 2,4,6-octatriene, or cyclic olefins and polyolefins such as cyclopentadiene, norbornene, dicyclopentadiene, 5-methylene-2-norbornene, etc.

The following examples will illustrate the process of copolymerizing ethylene with another olefin in accordance with this invention. All parts and percentages are by weight unless otherwise indicated. The molecular weight of the copolymer is indicated by the citation of the reduced specific viscosity (RSV) of the copolymer as measured in decalin at 135° C. By the term "reduced specific viscosity" or "RSV" is meant the $\eta$ sp./C. determined on a 0.1% w./v. solution of the polymer in decahydronaphthalene at 135° C.

EXAMPLES 1–44

In these examples ethylene and propylene were copolymerized in a 1.5 liter glass flow reactor. The apparatus was alternatively evacuated and flushed with nitrogen three times, 500 mls. of carbon tetrachloride were added under nitrogen, the apparatus was again alternately evacuated and flushed with nitrogen three times, and the temperature of the reactor was adjusted to 30° C. Streams of ethylene and propylene were metered through a calibrated rotameter, mixed, and introduced into the reactor below the liquid level. The diluent was saturated at the rate of 1 liter/min. with a mixture of the ethylene and propylene containing 68 mole percent of propylene. An additional rotameter was used to record the volume of the off-gas. When the inlet and off-gas rotameter readings were identical, indicating that saturation was complete, the volume of the input mixture was reduced to 250 ml./min. and the off-gas was passed through a thermal conductivity cell so that its composition could be monitored and kept constant at said mole percent of propylene throughout the copolymerization run. Vanadium tetrachloride in an amount equal to 0.0032 mmole/liter of carbon tetrachloride and diethylaluminum chloride or ethylaluminum sesquichloride in an amount equal to 4 mmoles/liter of carbon tetrachloride were then added to the reactor. As soon as the copolymerization reaction started, there was an immediate drop in the value of the off-gas rotameter reading. At this point a second monomer stream containing 30 mole percent of propylene was added at such a rate that the off-gas volume remained at 250 ml./min. and the off-gas composition remained at the saturation composition. Thus, the second stream was added at a rate that corresponded to the rate of the reaction throughout the run, and in this way the composition of the off-gas remained constant and insured the preparation of a copolymer of uniform composition. When the initial surge of activity ceased or decreased to a very low value, a given amount of the electron donor compound was added to the reactor and the copolymerization rate immediately rose. The copolymerization reaction was continued until the homogeneous reaction mixture became very viscous, or it was difficult to control the off-gas composition because of the change in the rate of solution of ethylene in the viscous mixture.

The copolymerization reaction mixture, which was completely homogeneous in each case, was quenched by adding 10 ml. of n-butanol and then was diluted with 100–200 ml. of heptane. The reaction mixture was washed with 200 ml. of 10% aqueous hydrochloric acid, the organic layer was separated and successively washed with water until the aqueous phase was neutral. The soluble copolymer was then isolated by removing the diluent.

Tabulated below are the electron donor compounds used and the amount thereof expressed as mmoles per liter of carbon tetrachloride, the aluminum compound used, the reaction time, the maximum rate of copolymerization expressed as grams of copolymer per mmole of vanadium per minute, the total amount of copolymer produced expressed as grams, and the RSV of the copolymer.

*Table 1*

| Example | Electron donor | | Aluminum compound | Max. rate of reaction, g./mmole V/min. | Reaction time, min. | Product | |
|---|---|---|---|---|---|---|---|
| | Compound | mmoles/ liter | | | | g. | RSV |
| Control | | | Al(C$_2$H$_5$)$_2$Cl | 60 | *5 | 0.5 | 1.2 |
| 1 | Acetone | 0.34 | Al(C$_2$H$_5$)$_2$Cl | 105 | 243 | 21.7 | 1.3 |
| 2 | Tetrahydrofuran | 2.2 | Ethylaluminum sesquichloride. | 110 | 98 | 8.9 | 1.7 |
| 3 | Dibutyl ether | 1.0 | ......do...... | 142 | 134 | 16.0 | 2.7 |
| 4 | 1,4-dioxane | 1.0 | ......do...... | 115 | 113 | 7.5 | 1.5 |
| 5 | Dibenzyl ether | 1.8 | ......do...... | 84 | 111 | 7.3 | 1.4 |
| 6 | Anisole | 3.4 | ......do...... | 50 | 80 | 2.9 | 1.7 |
| 7 | Diphenyl ether | 16 | ......do...... | 20 | 20 | | |
| 8 | Furan | 30 | ......do...... | 67 | 117 | 5.0 | 3.4 |
| 9 | Thiophene | 26 | ......do...... | 30 | 20 | 1.5 | 2.8 |
| 10 | Acetophenone | 0.2 | ......do...... | 75 | 120 | 13.7 | 3.1 |
| 11 | Benzophenone | 0.12 | ......do...... | 75 | 80 | 4.9 | 2.8 |
| 12 | Quinone | 0.3 | ......do...... | 33 | 120 | 8.9 | 3.2 |
| 13 | Mesityl oxide | 2.2 | ......do...... | 60 | 115 | 5.7 | 2.5 |
| 14 | Acetylacetone | 0.4 | Al(C$_2$H$_5$)$_2$Cl | 46 | 56 | 5.4 | 1.5 |
| 15 | Caproic aldehyde | 0.3 | Al(C$_2$H$_5$)$_2$Cl | 26 | 68 | 1.4 | 1.7 |
| 16 | Ethyl acetate | 0.1 | Al(C$_2$H$_5$)$_2$Cl | 80 | 114 | 14.5 | 1.5 |
| 17 | Vinyl acetate | 2.8 | Al(C$_2$H$_5$)$_2$Cl | 84 | 153 | 5.8 | 1.0 |
| 18 | Methyl acrylate | 2.2 | Al(C$_2$H$_5$)$_2$Cl | 100 | 178 | 13.5 | 1.0 |
| 19 | Methyl methacrylate | 1.6 | Al(C$_2$H$_5$)$_2$Cl | 42 | 109 | 3.3 | 0.9 |
| 20 | Acetic acid | 0.4 | Al(C$_2$H$_5$)$_2$Cl | 40 | 120 | 14.3 | 2.1 |
| 21 | Acetyl chloride | 0.1 | Al(C$_2$H$_5$)$_2$Cl | 65 | 105 | 4.2 | 1.2 |
| 22 | Ammonia | 2.0 | Ethylaluminum sesquichloride. | 115 | 64 | 6.7 | 1.4 |
| 23 | Aniline | 1.8 | ......do...... | 135 | 94 | 13.2 | 3.0 |
| 24 | Diphenylamine | 1.8 | ......do...... | 110 | 107 | 13.2 | 2.4 |
| 25 | Dimethylaniline | 2.2 | ......do...... | 115 | 149 | 10.8 | 1.5 |
| 26 | Triethylamine | 1.8 | ......do...... | 65 | 56 | 4.7 | 1.5 |
| 27 | n-Butylamine | 2.0 | Al(C$_2$H$_5$)$_2$Cl | 37 | 111 | 11.9 | |
| 28 | Di-n-propylamine | 2.0 | Al(C$_2$H$_5$)$_2$Cl | 26 | 101 | 8.2 | |
| 29 | Pyridine | 2.6 | Ethylaluminum sesquichloride. | 110 | 114 | 11.4 | 1.2 |
| 30 | 2-vinyl pyridine | 1.5 | Al(C$_2$H$_5$)$_2$Cl | 100 | 153 | 4.6 | 0.9 |
| 31 | 4-vinyl pyridine | 2.4 | Al(C$_2$H$_5$)$_2$Cl | 67 | 131 | 2.8 | 0.9 |
| 32 | Acetonitrile | 0.1 | Al(C$_2$H$_5$)$_2$Cl | 20 | 155 | 5.5 | 1.5 |
| 33 | Acrylamide | 3.5 | Al(C$_2$H$_5$)$_2$Cl | 84 | 159 | 10.9 | 1.1 |
| 34 | Phosphorus trichloride | 0.5 | Al(C$_2$H$_5$)$_2$Cl | 60 | 143 | 7.5 | 2.1 |
| 35 | Tributyl phosphine | 0.1 | Al(C$_2$H$_5$)$_2$Cl | 100 | 143 | 22.2 | 2.6 |
| 36 | Triphenyl phosphine | 0.1 | Al(C$_2$H$_5$)$_2$Cl | 50 | 127 | 5.8 | 1.1 |
| 37 | Triphenyl phosphite | 0.1 | Al(C$_2$H$_5$)$_2$Cl | 45 | 80 | 5.9 | 1.6 |
| 38 | Trimethyl phosphite | 0.1 | Al(C$_2$H$_5$)$_2$Cl | 125 | 123 | 12.4 | 1.5 |
| 39 | Tributyl stibine | 0.08 | Al(C$_2$H$_5$)$_2$Cl | 115 | 92 | 23.2 | 1.7 |

See footnote at end of table.

Table 1—Continued

| Example | Electron donor | | Aluminum compound | Max. rate of reaction, g./mmole V/min. | Reaction time, min. | Product | |
|---|---|---|---|---|---|---|---|
| | Compound | mmoles/ liter | | | | g. | RSV |
| 40 | Triphenyl stibine | 2.6 | Ethylaluminum sesquichloride. | 85 | 72 | 5.9 | 3.6 |
| 41 | Antimony pentachloride. | 0.4 | ..do.. | 100 | 60 | 3.7 | 3.3 |
| 42 | Triphenyl arsine | 0.6 | ..do.. | 115 | 82 | 3.7 | 3.2 |
| 43 | Decyl sulfide | 0.6 | ..do.. | 40 | 17 | 0.9 | 1.8 |
| 44 | Butyl sulfoxide | 0.4 | $Al(C_2H_5)_2Cl$ | | 83 | 6.5 | 1.0 |

*Polymerization terminated after 5 minutes since rate became too low to detect.

EXAMPLES 45–46

In these examples ethylene and propylene were copolymerized in carbon tetrachloride following the procedure of Examples 1–44 except that no electron donor compound was added and the temperature was held at 60° C. rather than 30° C. In Example 45, diethylaluminum chloride was injected to give 4 mmoles/liter of carbon tetrachloride, followed by 0.003 mmole of vanadium tetrachloride per liter of carbon tetrachloride. There was a rapid surge of polymerization which died out almost immediately to a low rate. Over a period of time the rate increased, the color of the solution became darker, and the percentage of propylene in the off-gas decreased. The product produced was essentially all soluble in acetone, indicating low molecular weight polypropylene oil prepared by a cationic process. In Example 46, ethylaluminum dichloride was substituted for the diethylaluminum chloride of Example 45. The reaction mixture immediately became dark brown in color and the temperature could not be controlled. Reduction of the initial temperature to 30° C. gave the same uncontrollable reaction.

EXAMPLE 47

Ethylene and propylene were copolymerized according to the procedure of Examples 1–44 except that the temperature was held at 60° C., and 4 mmoles of anisole/liter of carbon tetrachloride were added prior to the addition of 4 mmoles ethylaluminum dichloride and 0.0032 mmole vanadium tetrachloride per liter of carbon tetrachloride. The copolymerization reaction was smooth and well controlled. After 80 minutes the reaction mixture was quenched as in Examples 1–44. The product, 7.25 g. of polymer, was dissolved in heptane and then poured into acetone to precipitate the high molecular weight polymer. 6.79 g. of polymer having an RSV of 1.4 was recovered as the acetone-insoluble polymer.

EXAMPLE 48

The procedure of Example 47 was repeated using a reactor temperature of 50° C., 4.0 mmoles dibutyl ether, 5.0 mmoles ethylaluminum dichloride, and 0.003 mmole vanadium tetrachloride per liter of carbon tetrachloride. The copolymerization proceeded at a fast rate, decreasing to about one-half the initial rate in 70 minutes. The reaction mixture was then quenched, giving 25.86 g. of acetone-insoluble polymer having an RSV of 2.1 and 2.8 g. of acetone-soluble polymer (oils plus low molecular weight amorphous copolymer).

EXAMPLE 49

The procedure of Example 48 was repeated using 4.0 mmoles ethyl acetate, 4.5 mmoles ethylaluminum dichloride, and 0.003 mmole vanadium tetrachloride per liter of carbon tetrachloride. The copolymerization showed almost no decrease in rate over a total of 97 minutes and gave 24.05 g. of acetone-insoluble copolymer of RSV 1.8 and 3.2 g. of copolymer soluble in acetone.

EXAMPLES 50–53

The procedure of Examples 1–44 was repeated using 0.009 mmole of various vanadium compounds, 4 mmoles of diethylaluminum chloride, and 1.4 mmoles of dibutyl ether per liter of carbon tetrachloride, the dibutyl ether in each case being added initially. Details of the reaction and product are tabulated in Table II.

Table II

| Ex. | Vanadium compound | Max. rate of reaction, g./mm V/min. | Reaction time, min. | Product | |
|---|---|---|---|---|---|
| | | | | g. | RSV |
| 50 | $VO(O$-$t$-$C_4H_9)_3$ | 56 | 150 | 23.2 | 1.2 |
| 51 | $VOCl_3$ | 62 | 100 | 15.0 | 1.2 |
| 52 | $V(acetylacetonate)_3$ | 62 | 91 | 9.0 | 1.1 |
| 53 | $VO(acetylacetonate)_2$ | 80 | 120 | 16.9 | 1.1 |

What I claim and desire to protect by Letters Patent is:

1. In the process for copolymerizing ethylene with at least one other ethylenically unsaturated hydrocarbon in carbon tetrachloride in the presence of a catalyst formed from a vanadium compound soluble therein and an alkylaluminum compound, the improvement which comprises carrying out the copolymerization in the presence of, per liter of carbon tetrachloride, about 0.0005 to about 0.05 mmole of said vanadium compound and about 0.1 to about 100 mmoles of said alkylaluminum compound, and in the presence of an electron donor compound selected from the group consisting of ammonia, amines, amides, nitriles, pyridines, phosphines, phosphites, phosphorous halides, arsines, arsenic halides, stibines, antimony halides, bismuthines, bismuth halides, ethers, esters, aldehydes, ketones, acids, acid halides, phenols, sulfoxides, sulfones, sulfates, sulfonates, sulfonamides, sulfoximes, sulfides, selenides, and tellurides, said electron donor compound being chemically reactive with the alkylaluminum compound by sharing electrons therewith and being present in an amount sufficient to activate said catalyst but insufficient to complex all of said alkylaluminum compound.

2. The process of claim 1 in which said ethylenically unsaturated hydrocarbon is propylene.

3. The process of claim 1 in which the copolymerization is carried out at a temperature within the range of about 0° to about 80° C.

4. The process of claim 1 in which the vanadium compound is selected from the group consisting of vanadium tetrachloride, tri-t-butyl orthovanadate, vanadium oxytrichloride, vanadium triacetylacetonate, and vanadium oxydiacetylacetonate.

5. In the process for copolymerizing ethylene with at least one other ethylenically unsaturated hydrocarbon in carbon tetrachloride in the presence of a catalyst formed from a vanadium compound soluble therein and an alkylaluminum compound, the improvement which comprises carrying out the copolymerization in the presence of, per liter of carbon tetrachloride, about 0.0005 to about 0.05 mmole of said vanadium compound and about 0.1 to about 100 mmoles of said alkylaluminum compound, and in the presence of an electron donor compound selected from the group consisting of dibutyl ether, tetrahydrofuran, acetone, acetic acid, ammonia, n-butylamine, triphenyl arsine, anisole, ethyl acetate, tributyl stibine, benzophenone, and trimethyl phosphite, said electron donor compound being chemically reactive with the alkylaluminum compound by sharing electrons therewith and being present in an amount sufficient to activate said catalyst but insufficient to complex all of said alkylaluminum compound.

References Cited by the Examiner

UNITED STATES PATENTS 2,958,688  11/60  Coover et al. -------- 260—88.2
3,072,629   1/63  Coover et al. -------- 260—88.2

FOREIGN PATENTS 809,717   3/59  Great Britain.
857,183  12/60  Great Britain.

JOSEPH L. SCHOFER, *Primary Examiner.*